(12) United States Patent
Fram

(10) Patent No.: US 10,201,905 B2
(45) Date of Patent: Feb. 12, 2019

(54) FIBER CUTTING DEVICE

(76) Inventor: Jerry R. Fram, Los Angeles, CA (US)

(*) Notice: Subject to any disclaimer, the term of this patent is extended or adjusted under 35 U.S.C. 154(b) by 1717 days.

(21) Appl. No.: 12/783,527

(22) Filed: May 19, 2010

(65) Prior Publication Data

US 2010/0294096 A1    Nov. 25, 2010

Related U.S. Application Data

(60) Provisional application No. 61/179,565, filed on May 19, 2009.

(51) Int. Cl.
*B26D 1/40* (2006.01)
*B26D 1/62* (2006.01)
*C03B 37/16* (2006.01)
*D01G 1/04* (2006.01)
*B26D 7/06* (2006.01)

(52) U.S. Cl.
CPC ............ *B26D 1/40* (2013.01); *B26D 1/62* (2013.01); *B26D 7/06* (2013.01); *C03B 37/16* (2013.01); *D01G 1/04* (2013.01); *Y10T 83/04* (2015.04); *Y10T 83/4769* (2015.04); *Y10T 83/4838* (2015.04); *Y10T 83/4841* (2015.04); *Y10T 83/6579* (2015.04)

(58) Field of Classification Search
CPC .... B26D 1/40; B26D 7/06; B26D 1/62; C03B 37/16; D01G 1/04; Y10S 83/913; Y10S 83/95; Y10T 83/04; Y10T 83/4769; Y10T 83/4838; Y10T 83/4841; Y10T 83/6579; Y10T 83/741; Y10T 83/743; Y10T 83/7713; Y10T 83/7718

USPC ......... 83/322, 346, 347, 913, 950, 422, 446, 83/447, 475, 476; 241/185.5, 186.2, 222, 241/229, 235, 242, 293; 19/0.6

See application file for complete search history.

(56) References Cited

U.S. PATENT DOCUMENTS

| | | | | |
|---|---|---|---|---|
| 2,787,314 | A * | 4/1957 | Anderson | B29C 41/365 118/316 |
| 3,103,304 | A * | 9/1963 | Nawalanic | D01G 1/04 19/0.6 |
| 3,873,290 | A * | 3/1975 | Marzocchi | C03B 37/16 241/222 |
| 3,992,967 | A | 11/1976 | Fram | |
| 4,287,799 | A | 9/1981 | Fujita et al. | |
| 4,583,437 | A | 4/1986 | Rader et al. | |
| 4,638,934 | A * | 1/1987 | Fram | 225/97 |
| 5,092,207 | A * | 3/1992 | Kikuchi et al. | 83/116 |
| 5,773,745 | A * | 6/1998 | Widmer | 89/1.11 |

(Continued)

*Primary Examiner* — Clark F Dexter
(74) *Attorney, Agent, or Firm* — Canady & Lortz LLP; Bradley K. Lortz

(57) ABSTRACT

A fiber cutting device is disclosed having a cutting head with one or more blades disposed across a surface of the cutting head and disposed to rotate about a cutting head axis. An anvil roller is disposed and driven to rotate about an anvil axis and has a surface in momentary contact with each the one or more blades of the cutting head. Fibers are delivered to the device across a feeder. A feed control toggle may be moved to a stop position, where a first end of the feed control toggle presses the plurality of fibers against the feeder to stop motion of the fibers and prevent cutting. Contact with the anvil roller to draw the fibers between the cutting head and the anvil may also be controlled by the feed control toggle. A flap for sliding contact between the fibers and the anvil may also be used.

20 Claims, 12 Drawing Sheets

(56) References Cited

U.S. PATENT DOCUMENTS

| | | |
|---|---|---|
| 5,873,291 A | 2/1999 | Sand |
| 5,970,837 A | 10/1999 | Arterburn et al. |
| 6,076,442 A | 6/2000 | Arterburn et al. |
| 6,401,581 B1 * | 6/2002 | Sand ................... C03B 37/16 |
| | | 241/60 |
| 6,527,211 B1 | 3/2003 | Bellasalma |
| 6,564,684 B2 * | 5/2003 | Bascom et al. ................. 83/105 |
| 6,598,814 B2 * | 7/2003 | Bascom et al. ............ 440/88 F |
| 6,708,592 B2 * | 3/2004 | Bascom et al. ............. 83/436.3 |
| 6,892,617 B1 | 5/2005 | Knauder |
| 7,413,136 B2 * | 8/2008 | Bascom et al. ................. 241/30 |
| 7,832,315 B2 * | 11/2010 | Bascom et al. ................. 83/105 |

* cited by examiner

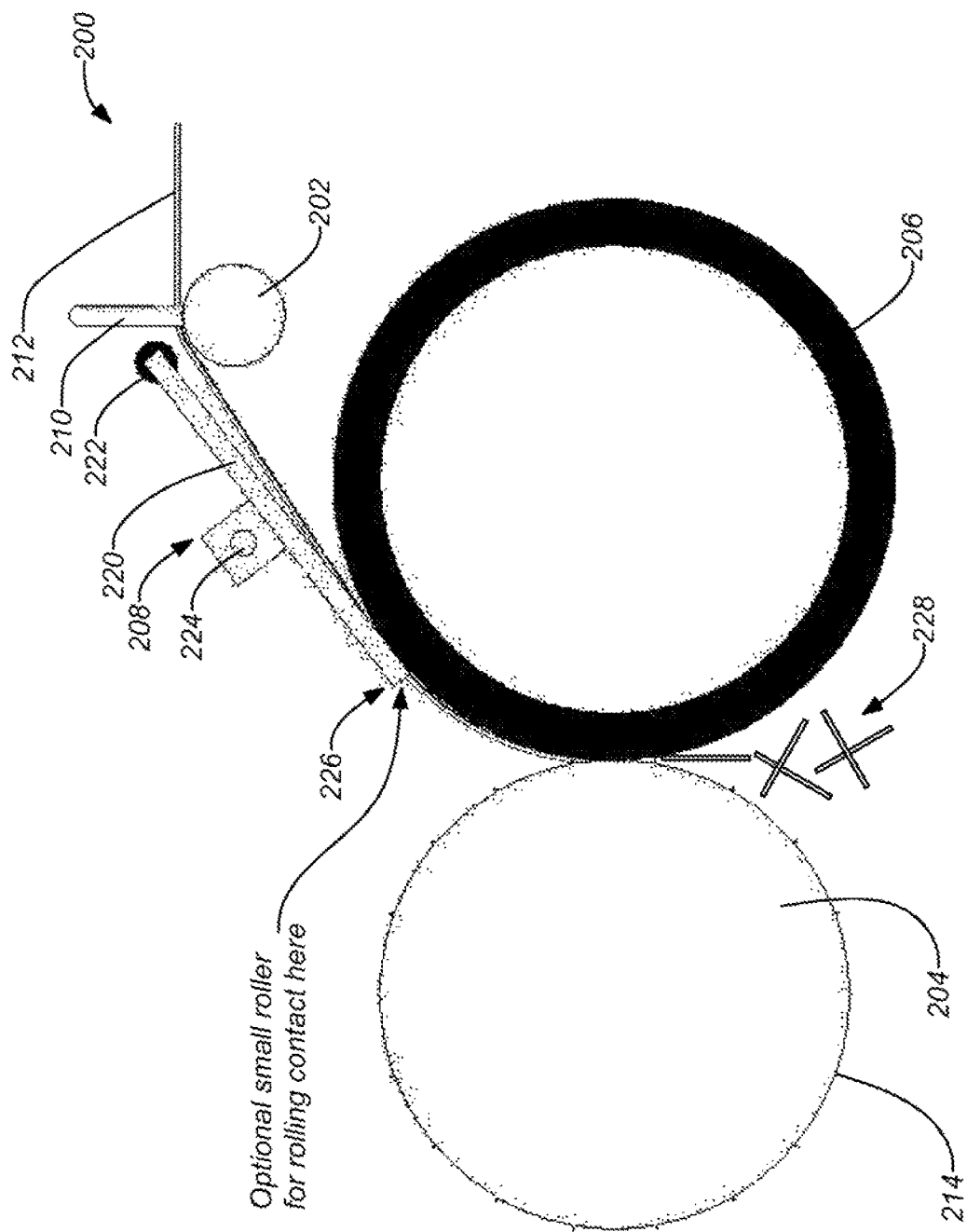

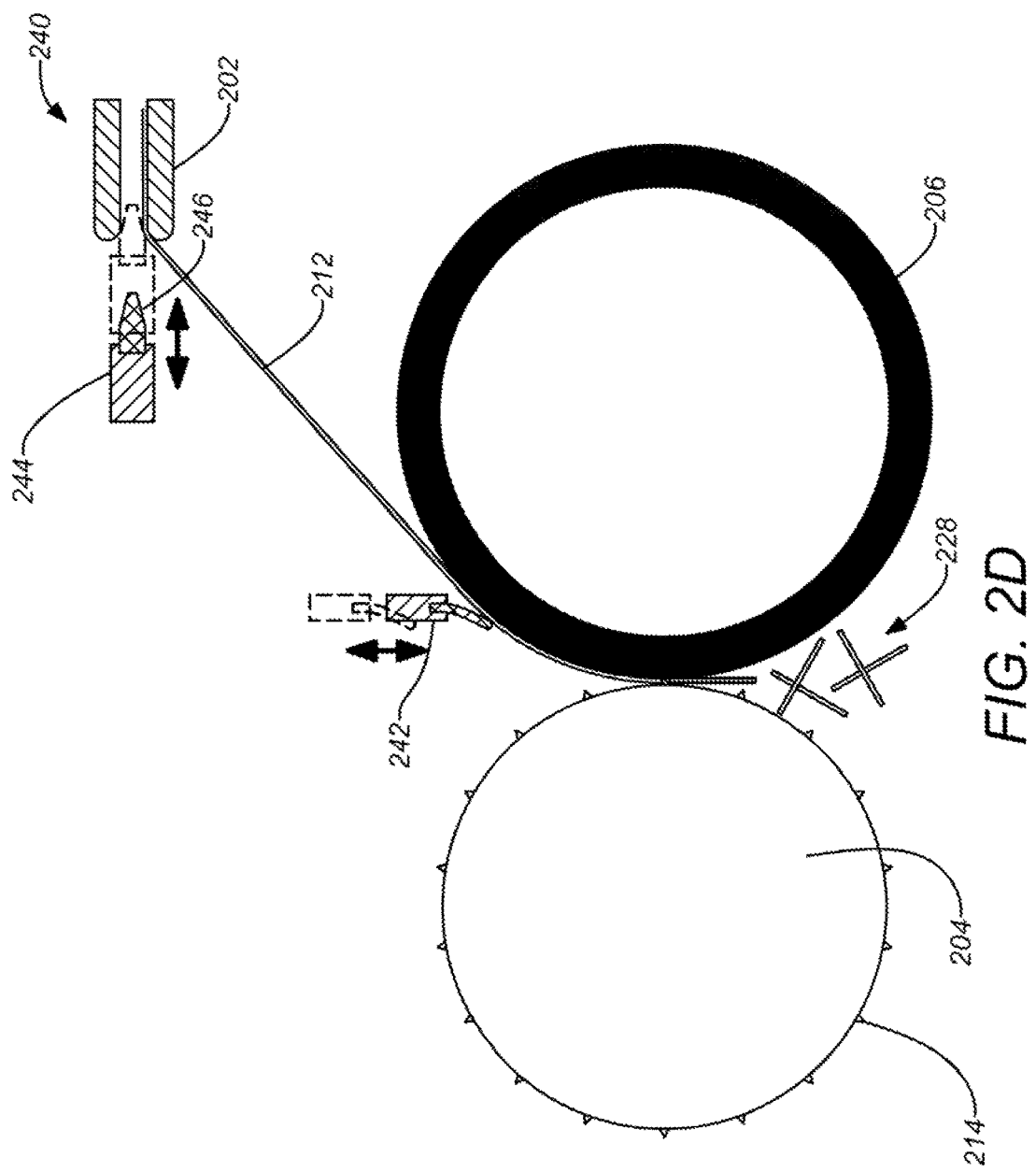

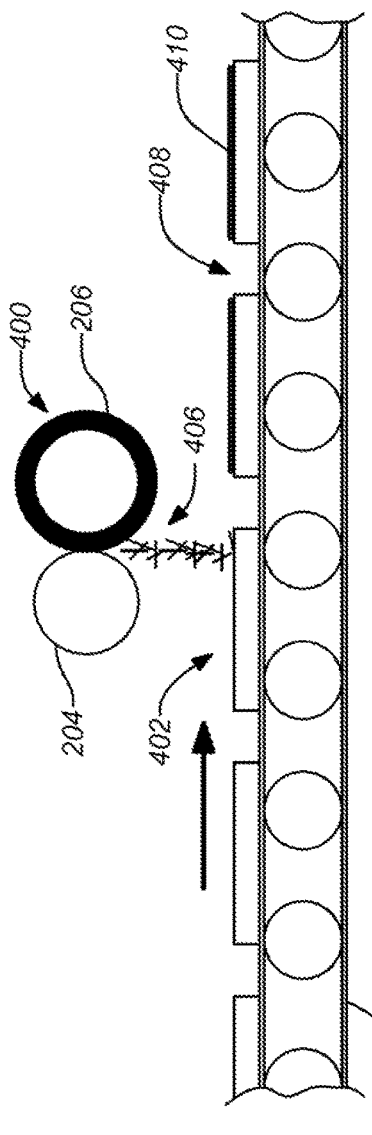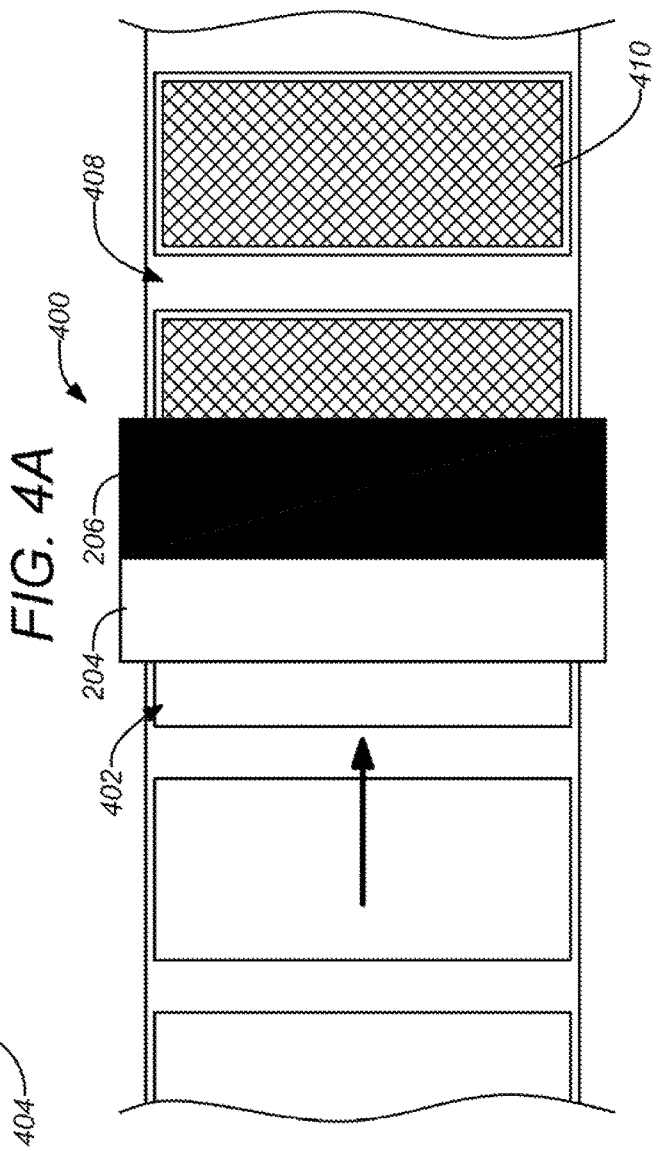

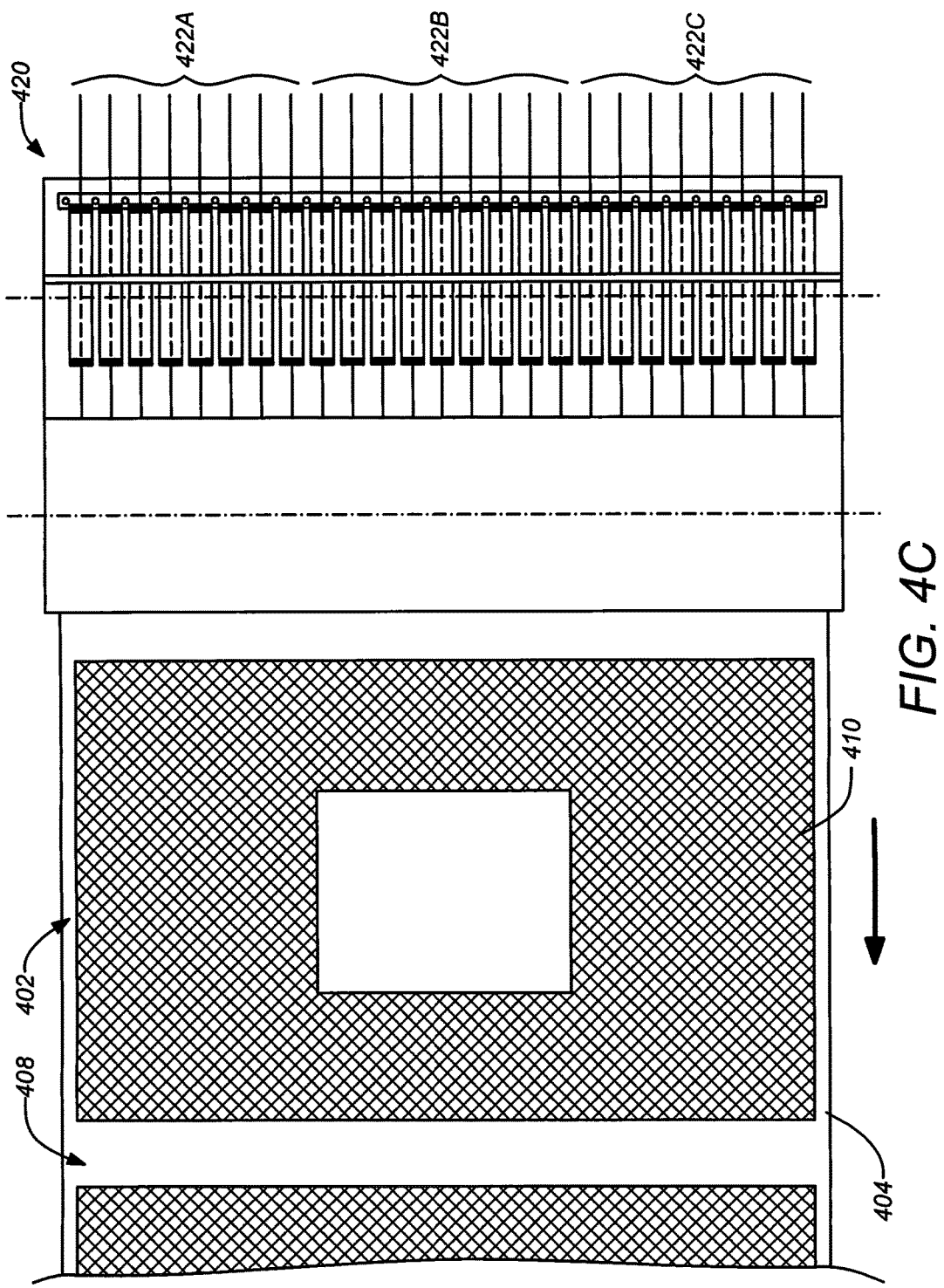

FIBER CUTTING DEVICE

CROSS-REFERENCE TO RELATED APPLICATIONS

This application claims the benefit under 35 U.S.C. § 119(e) of the following U.S. provisional patent application, which is incorporated by reference herein:

U.S. Provisional patent application No. 61/179,565, filed May 19, 2009, and entitled "FIBER CUTTING DEVICE", by Fram.

BACKGROUND OF THE INVENTION

1. Field of the Invention

This invention relates to composite manufacturing. Particularly, this invention relates to techniques for cutting fibers such as glass fibers to be used in composite manufacturing.

2. Description of the Related Art

Some existing methods of cutting fibers, e.g. such as cutting glass fibers as may be used in composite manufacturing, employ two rollers, one having a series of horizontal cutting blades and another having a hard rubber surface. The rollers are rotated together in contact so that when strands of glass fibers pass between them the fibers are broken into short segments by the cutting blades.

U.S. Pat. No. 3,992,967 issued Nov. 23, 1976 to Morris Fram, discloses a fiber cutter for cutting lengths of glass fibers and glass rovings into short lengths includes a cutter roller carrying a plurality of cutting blades and shaped annular means cooperatively associated with a resilient back-up roll means. In operation the force executed between the cutter roller and the back-up roller controls the spacing between the rollers by forcing the shaped annular means into the resilient surface of the back-up roller means. In addition to permitting control of spacing, the coaction of the cutter roller with its shaped annular means and the resilient back-up roll means holds the rollers in alignment, reduces the bounce between the rollers as the blades engage and pass over the back-up roll means and permit force to be used to build the blades in engagement with the back-up roll means without blade breakage.

FIGS. 1A and 1B are schematic diagrams of an example prior art fiber cutting device. FIG. 1A is an isometric view of the typical three rollers of a prior art fiber cutting device 100 and a feed bar 102. FIG. 1B is a side view of the same prior art fiber cutting device 100. The cutting device 100 includes one roller as a cutting head 104 which has blades 114 mounted on its surface. The cutting head 104 rotates clockwise. The adjacent roller is a rubber surfaced anvil roller 106. The anvil roller 106 rotates counter-clockwise. Finally, the upper roller is a feed roller 108, which rotates clockwise against the anvil roller 106 and draws the glass fibers 112 into the space between the cutting head 104 and the anvil roller 106 to be cut. The feed bar 102 is mounted on the upper right-hand side with pins 110 to guide the glass fibers 112 (or strands). In the example, twelve glass strands 112 are shown entering the cutting device 100, spaced substantially evenly across the width of the feed bar 102. Typically, the fibers 112 are long continuous strands, which may be packaged as separate balls (not shown), that each deliver a fiber end drawn from the center. However, sometimes they come in spools (not shown). In some devices, plastic tubes or ceramic eyelets (not shown) are used to feed the strands to the cutting device 100.

The glass fibers 112 are pulled into the nip point between the cutting head and anvil roller 106, and the blades 114 mounted on the cutting head 104 part the fiber 112 through a breaking action and not so much by actually slicing. This is because the glass fiber cannot bend around the sharp radius of the blade as it is squeezed against the rubber surface of the anvil roll and the fiber is brittle enough to fracture. Thus, the blades 114 of the cutting head 104 can be dull by normal standards and still part the glass fiber 112.

One known problem with fiber cutting devices employing a feed roller 108 like the prior art device 100 described above occurs if any of the fibers 112 should stick to the feed roller 108 surface even momentarily. If this should occur, the fiber 112 will begin to spool around the feed roller 108. The fiber cutting device 100 must then be shut down in order for the fiber 112 to be tediously removed from the feed roller 108 so that the device may be reset for cutting to begin again. Over the years, glass fiber cutting techniques have further evolved.

U.S. Pat. No. 4,287,799 issued Sep. 8, 1981 to Fujita et al., discloses a cutting roller of a glass filament chopping apparatus mounts a plurality of spaced, axially parallel cutting blades 19 held in receiving grooves by retainer strips. The peripheral flange surfaces of the cutting roller on the opposite ends of the roller drum are raised to almost the radius of the cutting blade edges, and serve as driving engagement surfaces when the rotating cutting roller is biased into contact with a feed roller.

U.S. Pat. No. 5,873,291 issued Feb. 23, 1999 to Sand, discloses an apparatus for cutting fibrous reinforcement material in relationship with an ejector nozzle. The apparatus comprises at least two feeding rollers and a rotary cutter which is provided with a substantially cylindrical mantle surface with attachments for a number of knives. These cooperate with a support roller with an elastic surface layer for forming a thread nip. The mantle surface of the cutter is provided with slot-shaped recesses for the fiber thread, which recesses extend peripherally along the mantle surface and between successive knives. The recesses enable the thread to be fed forward by means of the feeding rollers at a feeding rate which deviates from the speed of the cutter, for adaptation of the cutting length of the fiber thread.

U.S. Pat. No. 5,970,837 issued Oct. 26, 1999 and U.S. Pat. No. 6,076,442 issued Jun. 20, 2000 both to Arterburn et al., disclose a type of multi-chopper for cutting strands or ribbon shaped material such as strands of glass fibers, and a method of using this chopper, is disclosed. The chopper has at least two chopper assemblies on a rotating frame. When one chopper assembly needs repair, the frame is rotated which brings a rebuilt or repaired chopper assembly into operating position quickly and also brings the assembly needing repair into a position where it can be worked on while the other chopper is operating resulting in much reduced downtime. The frame of the chopper can rotate around a vertical or horizontal line, or around a line passing through two opposite corners of a frame.

U.S. Pat. No. 6,527,211 issued Mar. 4, 2003 to Bellasalma, discloses a fiber chopper overcoming the disadvantages of the previous cutting rollers for chopping continuous filaments. The apparatus includes a means for feeding continuous fibers to a chopping roller. A spring holds the cutting blades on the chopping roller. The filaments pass between the chopping roller and a feed roller for chopping.

U.S. Pat. No. 6,892,617 issued May 17, 2005 to Knauder, discloses a charging arm for conveying, treating and discharging different starting materials in order to produce glass fiber armored plastic pipes.

Although developments in glass fiber cutting technology has occurred, there is a need in the art for apparatuses and methods for efficiently excluding cut fibers that may be employed in composite manufacturing. Particularly, there is a need for such apparatuses and methods to efficiently start and stop cutting in a well-controlled manner. In addition, there is a need for fiber cutting devices that eliminate the problem of fibers sticking and spooling around the feed roller resulting in lost production time. There is also a need for such apparatuses and methods to provide to deliver cut fibers for molded composite manufacturing. There is further a need for such systems and apparatuses to be cheaper and operate at higher production rates than existing systems and minimizing wasted fiber. These and other needs are met by the present invention as detailed hereafter.

SUMMARY OF THE INVENTION

A fiber cutting device is disclosed having a cutting head with one or more blades disposed across a surface of the cutting head and disposed to rotate about a cutting head axis. An anvil roller is disposed and driven to rotate about an anvil axis and has a surface in momentary contact with each the one or more blades of the cutting head. A plurality fibers are delivered to the device across a feeder. A feed control toggle moves between a stop position and a cutting position. In the stop position, a first end of the feed control toggle presses the plurality of fibers against the feeder to stop motion of the plurality of fibers and prevent cutting. In the cutting position, the plurality fibers are released. In addition, contact with the anvil roller to draw the fibers between the cutting head and the anvil may also be controlled by the feed control toggle. A flap for sliding contact between the fibers and the anvil may also be used.

Typically, the surface of the anvil roller comprises a hard rubberized material and the fibers comprise glass fibers. The feeder may comprise a feeder bar having a plurality of pins separating each of the plurality of glass fibers. The pivot of the feed control toggle may be disposed between the first end and the second end of the feed control toggle. In addition, the feed control toggle may comprise a planar rectangular plate and the pivot is disposed offset from a plane of the planar rectangular plate. The first end of the feed control toggle may include an edge for trapping the one or more fibers. The second end of the feed control toggle may include a roller to provide a rolling contact between the one or more fibers where the second end presses against the anvil roller or a flap to provide sliding contact between the fibers and the anvil roller.

A typical embodiment of the invention comprise a fiber cutting apparatus, including a cutting head disposed to rotate about a cutting head axis and having one or more blades disposed across a surface of the cutting head, an anvil roller disposed adjacent to the cutting head to rotate about an anvil axis and to have a surface in momentary contact with each of the one or more blades of the cutting head, a feeder for delivering a plurality of fibers between the cutting head and the anvil roller, and a feed control toggle that moves between a stop position where a first end of the feed control toggle presses the plurality of fibers against the feeder to stop motion of the plurality of fibers and prevent cutting and a cutting position where the first end of the feed control toggle releases the plurality of fibers to be drawn into the momentary contact with each of the one or more blades of the cutting head. The plurality of fibers are pressed against the surface of the anvil roller such that the surface of the anvil roller draws the plurality of fibers to be cut between the momentary contact with each of the one or more blades of the cutting head and the anvil roller only with the feed control toggle in the cutting position.

In some embodiments, a flap may provide a sliding contact pressing the plurality of fibers against the surface of the anvil roller. The surface of the anvil roller may comprise a hard rubberized material. In addition, the first end of the feed control toggle may include a edge for pressing the plurality of fibers against the feeder to stop motion of the plurality of fibers. The feeder may comprise a feed bar having a plurality of pins separating each of the plurality of glass fibers.

In further embodiments, a moving surface carrying workpieces may be disposed to receive the cut plurality of fibers wherein the feed control toggle is operated to intermittently prevent cutting of the plurality of fibers during any gaps between the workpieces. In addition, one or more additional feed control toggles each separately operable on the plurality of fibers to prevent cutting of a portion of the plurality of fibers may be used where the feed control toggle and the one or more additional feed control toggles are separately operated to deliver a two-dimensional pattern of the cut plurality of fibers onto the workpieces on the moving surface.

In further embodiments, a second end of the feed control toggle presses the plurality of fibers against the surface of the anvil roller in the cutting position. The second end of the feed control toggle may include a roller to provide a rolling contact pressing the plurality of fibers against the surface of the anvil roller. Alternately, the second end of the feed control toggle may include a flap to provide a sliding contact pressing the plurality of fibers against the surface of the anvil roller. A pivot of the feed control toggle may be disposed between the first end and the second end of the feed control toggle. Furthermore, the feed control toggle may comprise a planar rectangular plate and the pivot is disposed offset from a plane of the planar rectangular plate.

Another embodiment of the invention may comprise a fiber cutting apparatus, including a cutting head disposed to rotate about a cutting head axis and having one or more blades disposed across a surface of the cutting head, an anvil roller disposed adjacent to the cutting head to rotate about an anvil axis and to have a surface in momentary contact with each of the one or more blades of the cutting head, a feeder for delivering plurality of fibers between the cutting head and the anvil roller, and a flap for providing a sliding contact pressing the plurality of fibers against the surface of the anvil roller such that the surface of the anvil roller draws the plurality of fibers to be cut between the momentary contact with each of the one or more blades of the cutting head and the anvil roller. This fiber cutting apparatus embodiment may be modified consistent with other apparatus and method embodiments described herein.

Another embodiment of the invention may comprise a method of cutting fibers, including disposing a cutting head to rotate about a cutting head axis, the cutting head having one or more blades disposed across a surface of the cutting head, rotating an anvil roller disposed adjacent to the cutting head about an anvil axis, the anvil roller having a surface in momentary contact with each of the one or more blades of the cutting head, delivering plurality of fibers between the cutting head and the anvil roller with a feeder, pressing the plurality of fibers against the surface of the anvil roller such that the surface of the anvil roller draws the plurality of fibers to be cut between the momentary contact with each of the one or more blades of the cutting head and the anvil roller only with the feed control toggle in the cutting position, and moving a feed control toggle between a stop position where a first end of the feed control toggle presses the plurality of fibers against the feeder to stop motion of the plurality of fibers to prevent cutting and a cutting position where the first end of the feed control toggle releases the plurality of fibers to be drawn into the momentary contact with each of the one or more blades of the cutting head. This fiber cutting method embodiment may be modified consistent with other apparatus and method embodiments described herein. The method embodiment may further comprise moving a surface carrying one or more workpieces disposed to receiving the cut plurality of fibers; and moving the feed control toggle to intermittently prevent cutting of the plurality of fibers during gaps between the one or more workpieces. The method embodiment may also operate wherein one or more additional feed control toggles are each separately operable on the plurality of fibers to prevent cutting of a portion of the plurality of fibers and the feed control toggle and the one or more additional feed control toggles are separately operated to deliver a two-dimensional pattern of the cut plurality of fibers onto the one or more workpieces on the moving surface.

Yet another embodiment of the invention may comprise method of cutting fibers, including disposing a cutting head to rotate about a cutting head axis, the cutting head having one or more blades disposed across a surface of the cutting head, rotating an anvil roller disposed adjacent to the cutting head about an anvil axis, the anvil roller having a surface in momentary contact with each of the one or more blades of the cutting head, delivering plurality of fibers between the cutting head and the anvil roller with a feeder; and pressing the plurality of fibers against the surface of the anvil roller with a flap providing a sliding contact with the plurality of fibers such that the surface of the anvil roller draws the plurality of fibers to be cut between the momentary contact with each of the one or more blades of the cutting head and the anvil roller. This fiber cutting method embodiment may be modified consistent with other apparatus and method embodiments described herein.

BRIEF DESCRIPTION OF THE DRAWINGS

Referring now to the drawings in which like reference numbers represent corresponding parts throughout:

FIGS. 2A-2C are schematic diagrams of an example embodiment of a fiber cutting device;

FIG. 2D is a schematic diagram of another example embodiment of a fiber cutting device using a flap for pressing the fibers against the anvil;

FIGS. 4A and 4B illustrate an example embodiment of a fiber cutting device controlling depositing of cut fibers onto workpieces on a moving surface; and FIG. 4C illustrates an example embodiment of a fiber cutting device controlling depositing of cut fibers in a two-dimensional pattern onto workpieces on a moving surface.

DETAILED DESCRIPTION OF THE PREFERRED EMBODIMENT

1. Overview

As previously mentioned, embodiments of the invention are directed to improved techniques for precisely controlling the cutting of fibers, particularly glass fibers which may be used in composite manufacturing. A key element of a novel cutting device is a feed control toggle which may be used to intermittently stop the fibers being drawn by the anvil roller. The toggle presses the fibers against a feeder to temporarily stop the fibers. Another key element of a novel cutting is the use of a flap (as opposed to a roller) in order to press the fibers against the anvil roller and provide a sliding contact that avoid problems associated with fibers becoming stuck to a feed roller in the prior art.

In one example, the feed control toggle may be disposed between an anvil roller and a feed bar which delivers the fibers and pivots between a stop position and a cutting position. In the stop position, a first end of the feed control toggle contacts and traps the one or more fibers between the first end and the feed bar. In the cutting position, a second end of the feed control toggle presses the one or more fibers against the anvil roller such that the rotating anvil roller draws the one or more fibers to be cut between the blades of the cutting head and the anvil roller. The cutting head has one or more blades disposed across its surface and cuts (or breaks) the fibers as the blade press them against the anvil roller. Embodiments of the invention may employ any known cutting head and anvil roller design provided the anvil roller can draw the fibers under contact from the end of the feed control toggle.

Embodiments of the invention can have a range of applications. Particularly, embodiments of the invention are suited to deliver cut fibers in composite manufacturing especially where it is advantageous to have precise control over the starting and stopping of cut fiber delivery. For example a composite molding process may require that cut fibers are deposited into rein contained in a mold only in a precise area or over a precise period of time. Embodiments of the invention enable such precise control over cut fiber delivery. Accordingly, embodiments of the invention can allow for efficient manufacturing and reduced waste of such products. Precise control of individual cut strands afforded by the invention may be applied to drop a varying fiber pattern onto a moving surface for some applications. It is also advantageous that this delivery precision is provided directly as the fibers are cut; it is unnecessary to first cut the fibers and then provide a separate mechanism for controlled delivery in manufacturing a product. Those skilled in the art will appreciate other advantages derived from such cut fiber delivery precision.

2. Controlled Fiber Cutting Device

Figure 2A:
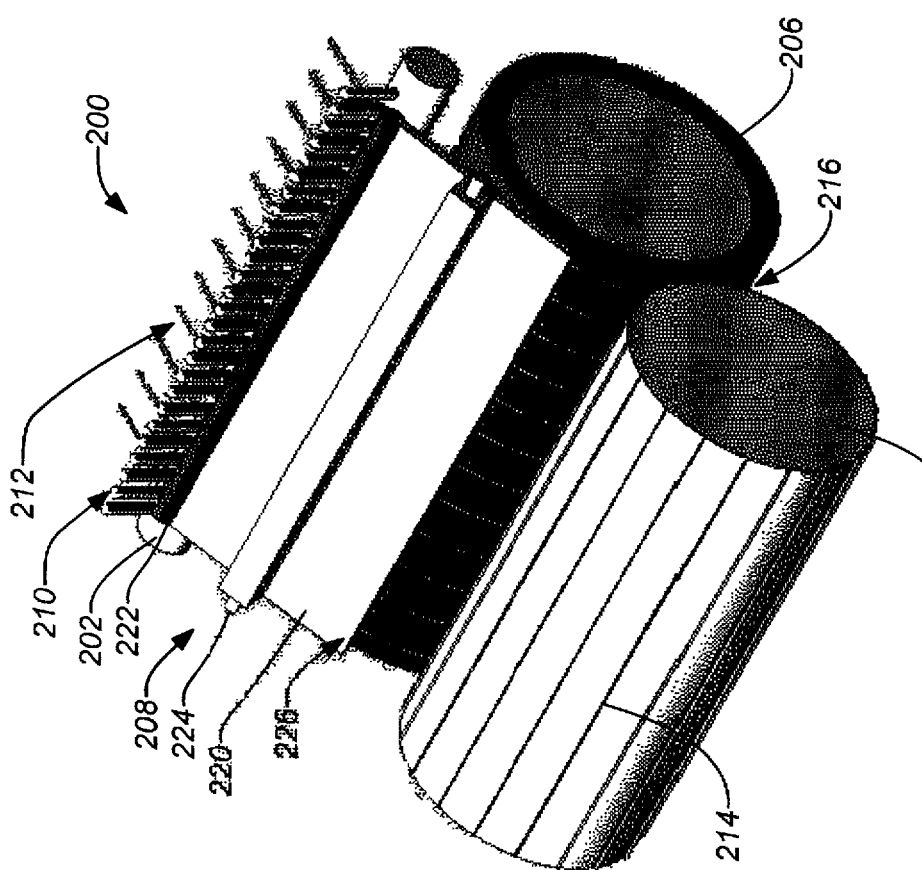
Figure 2B:
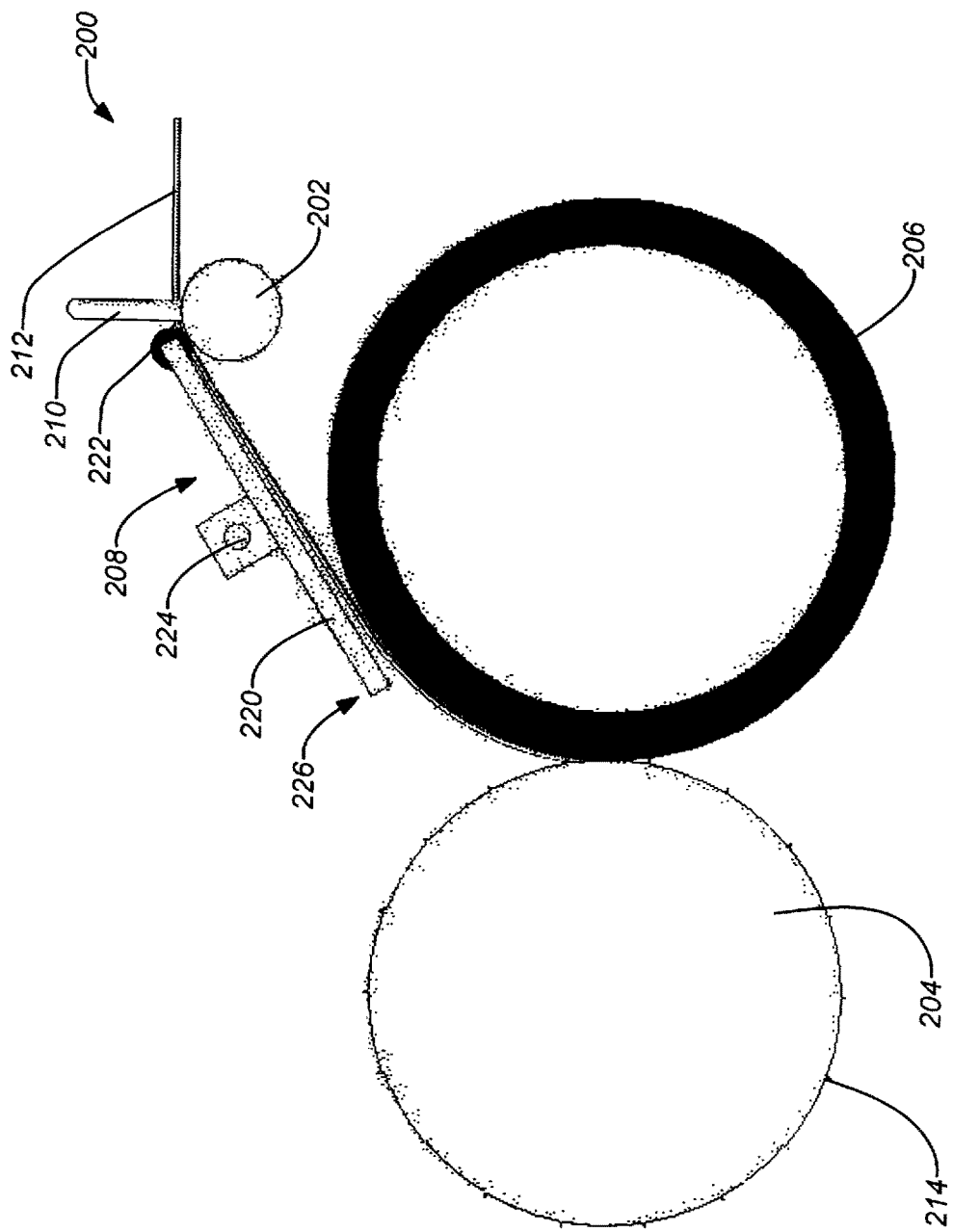

FIGS. 2A-2C are schematic diagrams of an example embodiment of a fiber cutting device 200 according to the present invention. FIG. 2A is an isometric view of the example fiber cutting device 200. FIG. 2B is a side view of the fiber cutting device 200 in the stop position. FIG. 2C is a side view of the fiber cutting device 200 in the cutting position. The cutting device 200 includes one roller as a cutting head 204 which has blades 214 mounted on its surface. Typically, a plurality of the blades 214 are each disposed to extend horizontally across the cutting head 204 surface parallel to the rotation axis and evenly spaced. However, those skilled in the art will appreciate that embodiments of the inventions may be employed with any type of cutting head 204 having different blade patterns and/or spacing. In the example cutting device 200, the cutting head 204 rotates clockwise and includes eighteen evenly spaced blades 214.

The adjacent roller is a rubber surfaced anvil roller 206. The anvil roller 206 rotates counter-clockwise. The feeder 202 (feed bar) is mounted above the anvil roller 206 having multiple pins 210 to guide the glass fibers 212 (or strands). In the example, twelve glass fibers 212 are shown entering the cutting device 200, spaced evenly across the width of the feed bar 202. As known in the art, the fibers 212 are long continuous strands, which may be packaged as separate balls or spools (not shown), that each deliver a strand end drawn from the center.

The glass fibers 212 are pulled into the nip point 216 between the cutting head 204 and anvil roller 206 as each of the blades 214 makes momentary contact with the anvil roller 206. As this occurs, the blades 214 mounted on the cutting head 204 part the fiber 212 through a breaking action and not so much by actually slicing. This is because the glass fiber 212 cannot bend around the sharp radius of the blade 214 as it is squeezed against the hard rubber surface of the anvil roller 206 and the fiber 212 is brittle enough to fracture. Thus, the blade 214 of the cutting head 204 can be relatively dull by conventional standards and still part the glass fiber 212.

In one example novel cutting device 200, the conventional feed roller is effectively replaced by a feed control toggle 208 which is toggled between a stop position and a cutting position. In this example, the feed control toggle 208 is in the form of a pivoting plastic plate 220 with an edge 222 on a first end of the plate 220 that contacts the feeder 202 in the stop position. The plate 220 pivots about a pivot point 224 offset from the plane of the plate 220. When a second end of the plate 220 presses against the anvil roller 206 in the cutting position, the glass fibers 212 are caught against the moving surface of the anvil roller 206 and drawn into the nip point 216 between the cutting head 204 and anvil roller 206. With only a small movement though, the feed control toggle 208 may be moved to the stop position where the edge 222 catches the glass fibers 212 against the feed bar 202 and stops them. In this manner, the cutting device 200 can be operated to rapidly start and stop the glass fiber 212 cutting. Those skilled in the art will appreciate that this principle can be applied to control individual strands to drop a varying fiber pattern onto a moving surface for some applications. In addition, it should also be noted that the motion of the feed control toggle 208 may be provided and controlled manually or by any suitable motorized or servo device as will be understood by those skilled in the art.

FIG. 2B is a side view of the fiber cutting device 200 in the stop position and FIG. 2C is a side view of the fiber cutting device 200 in the cutting position with cut fibers 228 falling from between the cutting head 204 and anvil roller 206. It is noted that in this example, the glass fibers 212 have a sliding contact with the second end 226 (which may be described as a flap) of the feed control toggle 208 against the anvil roller 206 in the cutting position. The use of such a flap 226 (which need not be implemented as part of a feed control toggle 208) presents a significant improvement over prior art feed rollers which can misfeed if fibers stick to the feed roller as previously described.

Figure 1A:
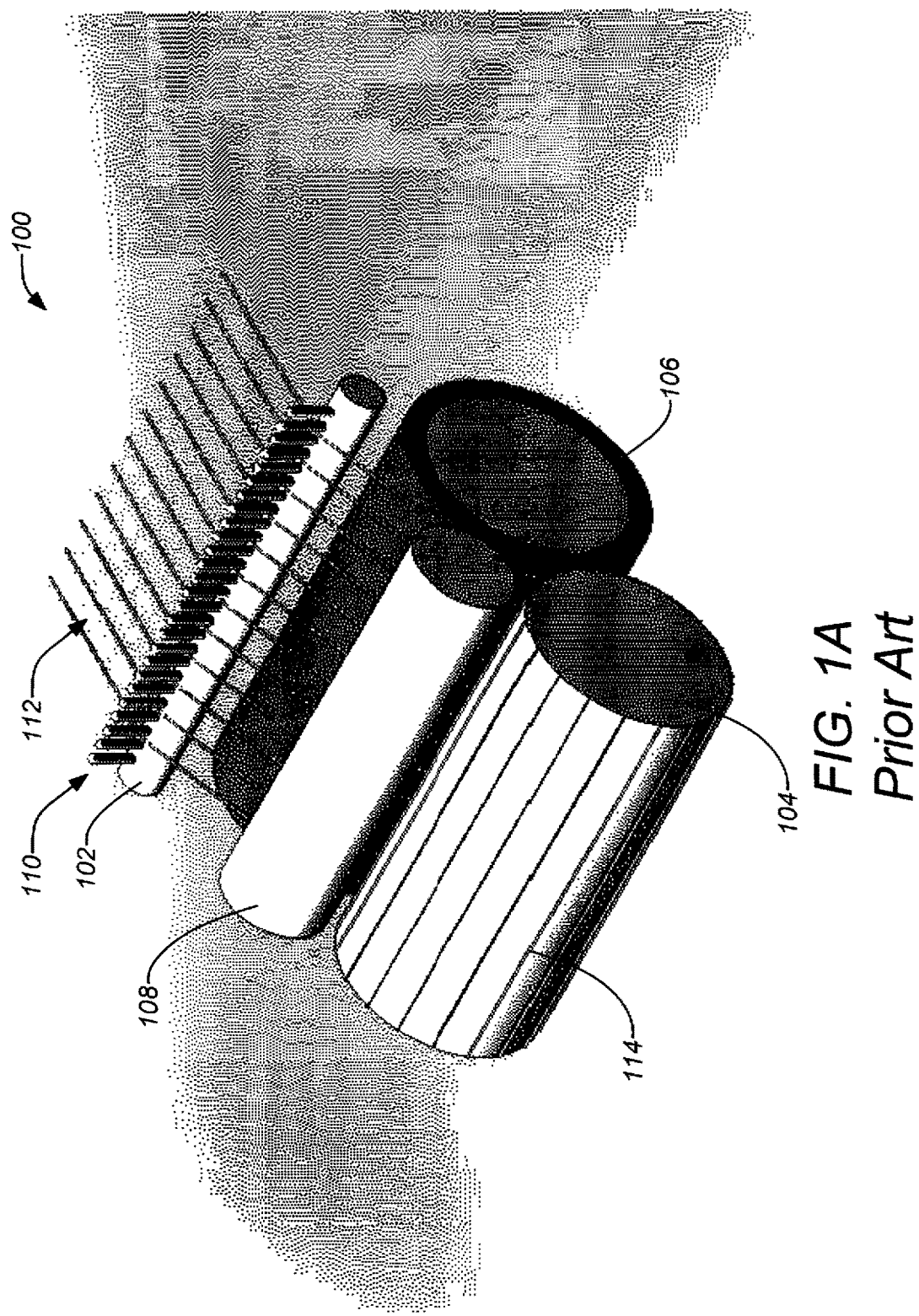
FIGS. 1A and 1B illustrate an example prior art fiber cutting device.
Figure 1B:
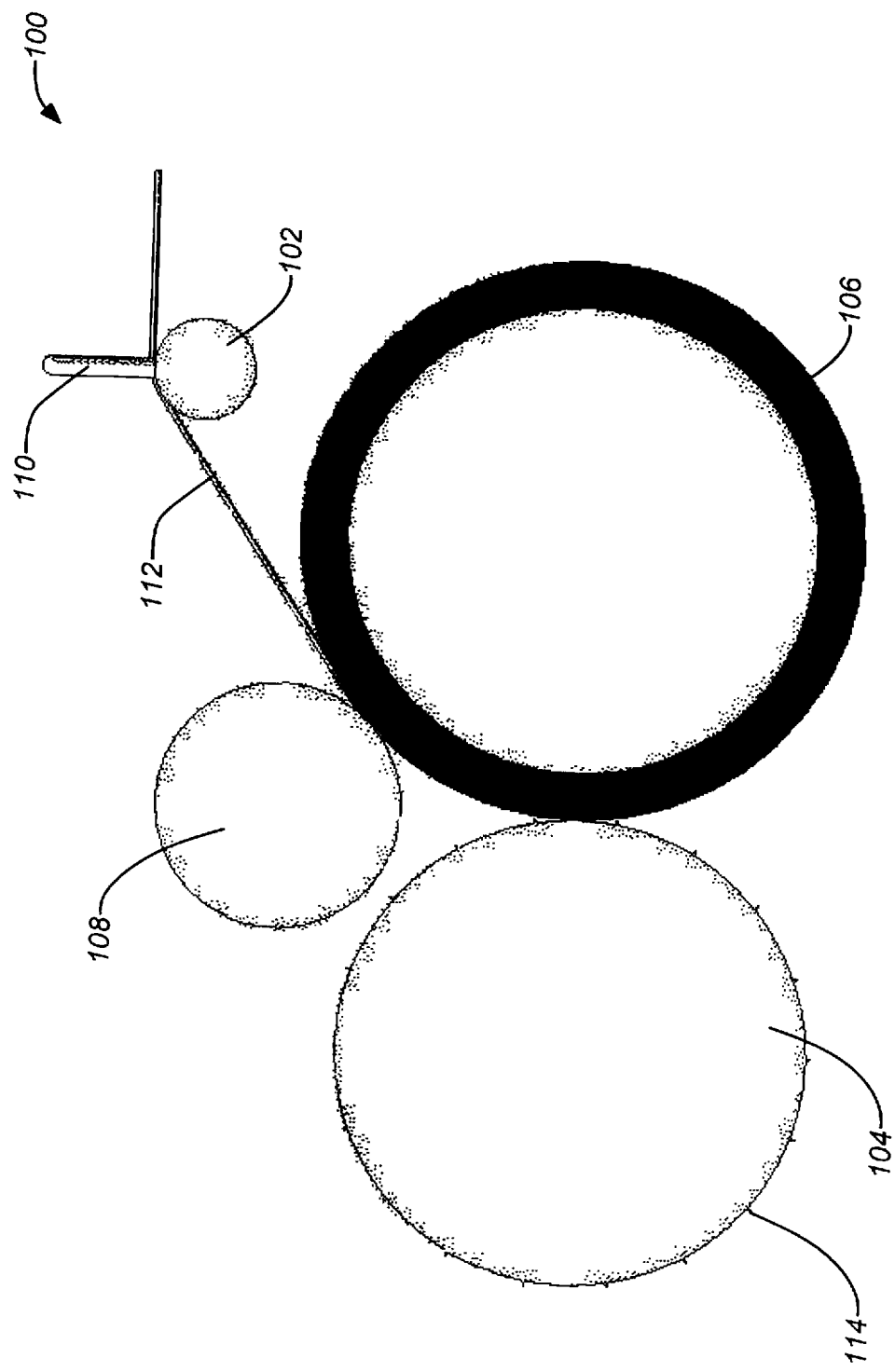

In other embodiments, a small roller 230 may be built into the second end 226 to provide a rolling contact between the anvil roller 206 and this end of the toggle 208. (In such embodiments the roller built into the second end 226 operates as a small version of a feed roller, e.g. as illustrated in FIGS. 1A & 1B.) See inset of FIG. 2C. It should also be noted that the configuration of the feed control toggle 208 is not restricted to a plate with an offset pivot point 224. Other shapes and forms and pivot positions may be readily developed provided the element toggles between the defined stop and cutting positions to provide adequate pressure of fibers 212 alternately to the feed bar 202 and the anvil roller 206.

FIG. 2D is a schematic diagram of another example embodiment of a fiber cutting device 240 using a flap 242 for pressing the fibers 212 against the anvil roller 206. Although it may be preferable to mechanically link the flap 242 and the feed control toggle 244 (e.g. as illustrated in the example device 200 of FIGS. 2A-2C), this cutting device 240 shows that a flap 242 may operate apart from a feed control toggle 244 and its edge 246. Thus, the flap 242 may be moved between a cutting position pressing the fibers 212 against the anvil roller 206 and a released position. In the cutting position, the pressure from the flap 242 allows significant drag to develop on the fibers 212 from the anvil roller 206 in the area between the contact point of the flap 242 and anvil roller 206 and the contact point of the cutting head 204 (blades 214) and the anvil roller 206. (It should be noted that in the released position some drag may still be present between the fibers 212 and the anvil roller 206.) The portion of the flap 242 in contact with the anvil roller 206 may be constructed from a rubber or rubber-like material with excellent wear resistance or any other suitable material known in the art.

It is also noted that this example fiber cutting device 240 employs a feeder 202 that comprises a plurality of feed tubes having separate openings for the fibers 212. In addition, the feed control toggle may be in the form of a "finger" that is moved into the opening to trap the fiber 212 and stop it. Thus, the feed control toggle 244 may be moved between a stop position pressing the fibers against the feeder 202 (i.e. the sides of the separate openings) to stop motion of the fibers 212 to prevent cutting and a released position. The released position may also be considered a cutting position provided adequate drag is present on the fibers 212 from the anvil roller 206 to draw them to be cut between the momentary contact with each of the one or more blades 214 of the cutting head 204 and the anvil roller 206 (e.g. from a flap 242 or feed roller).

It should be noted that the separate variations of the fiber cutting devices described herein may be implemented in any different combination. For example, a feed control toggle may be employed with either a flap or a feed roller against the anvil roller. A flap against the anvil roller may be employed with or without a feed control toggle. A flap or a feed roller against the anvil roller may be movable or fixed. If the flap or feed roller is movable, it may or may not be mechanically linked to the feed control toggle. The feeder may comprise a feeder bar or a feed tubes having separate openings. Furthermore, a plurality of feed control toggles may also be employed (as described in the next section).

Figure 3A:
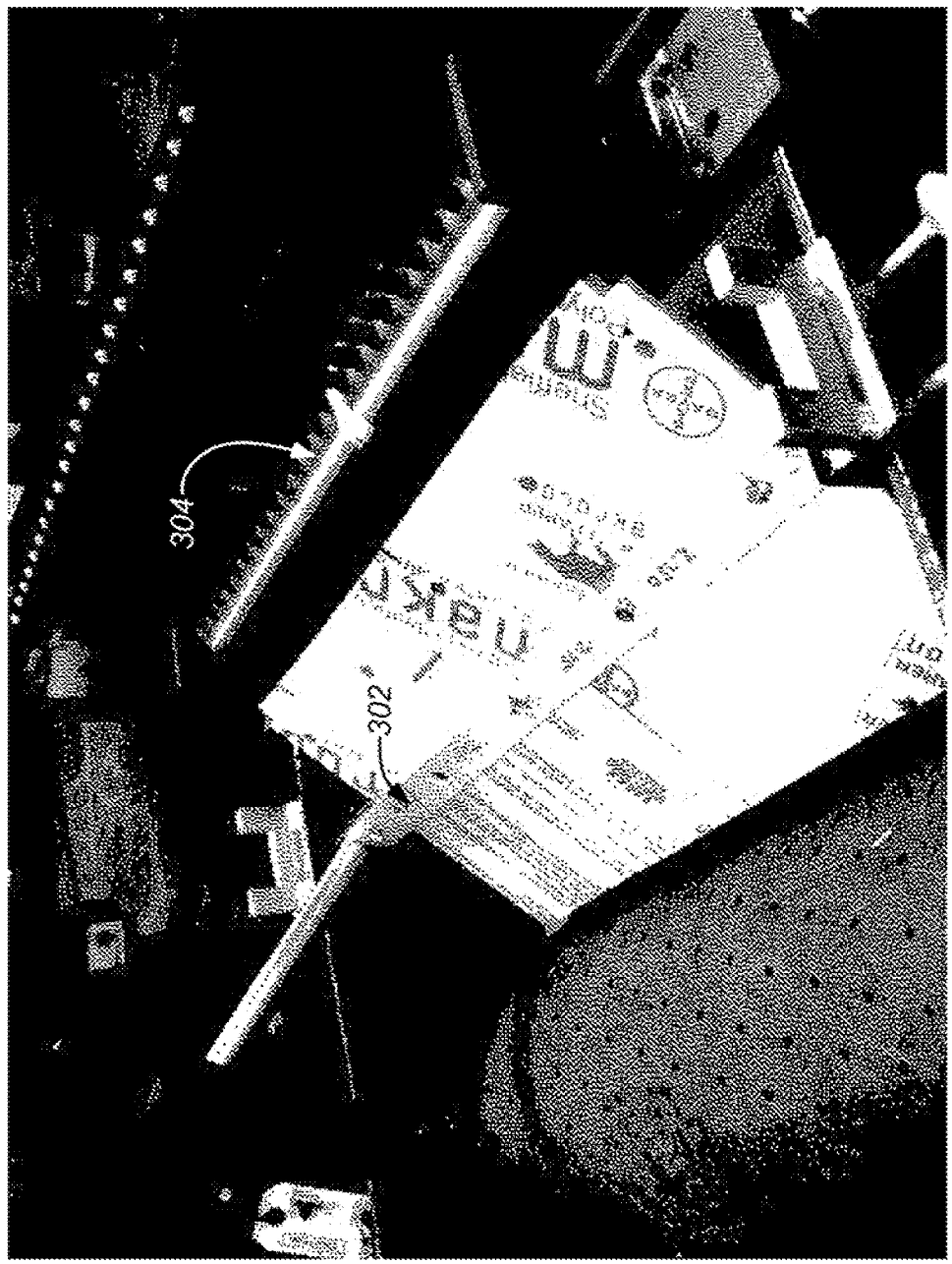
FIGS. 3A-3D illustrate an example embodiment of a fiber cutting device.
Figure 3B:
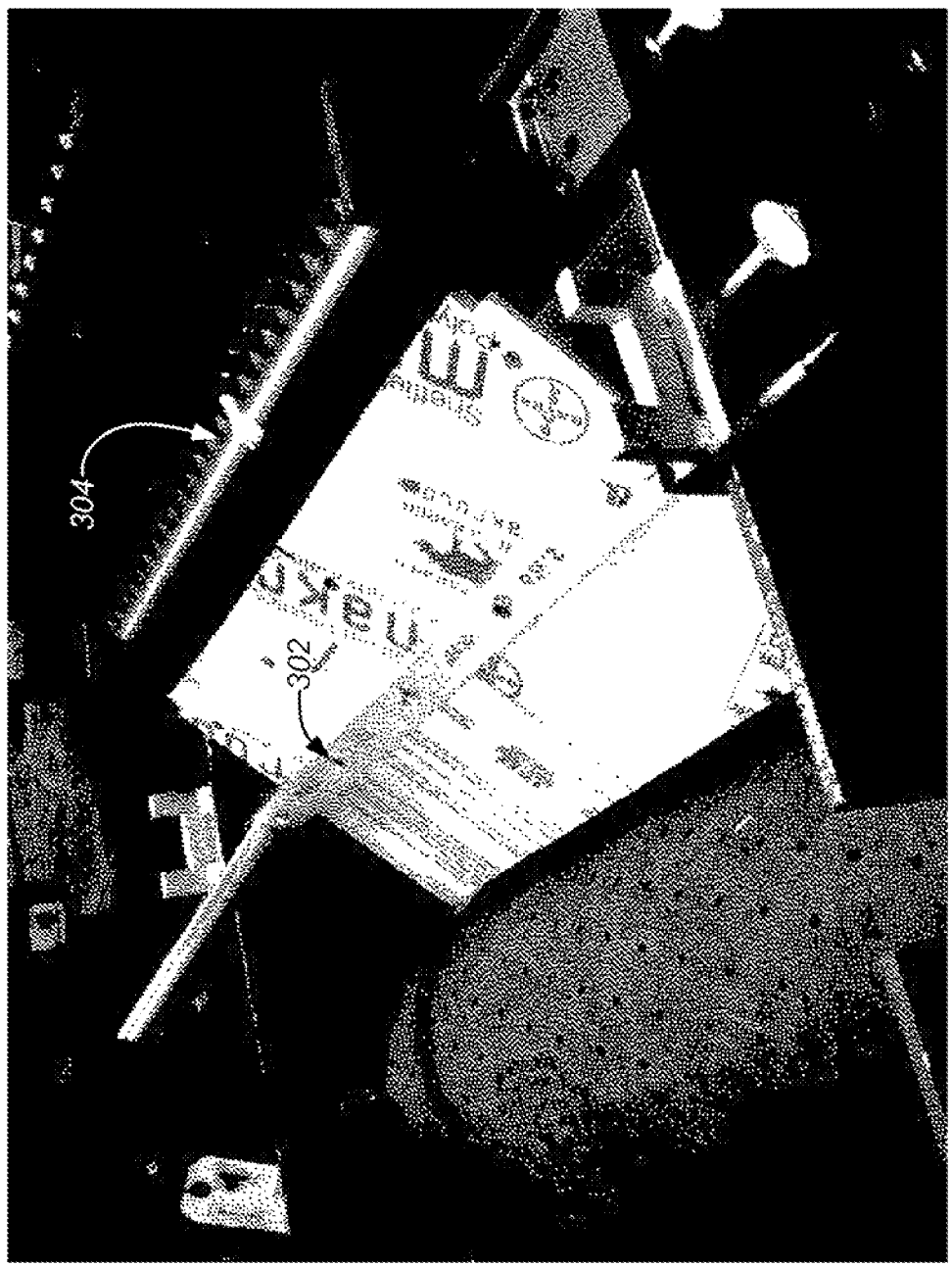
Figure 3C:
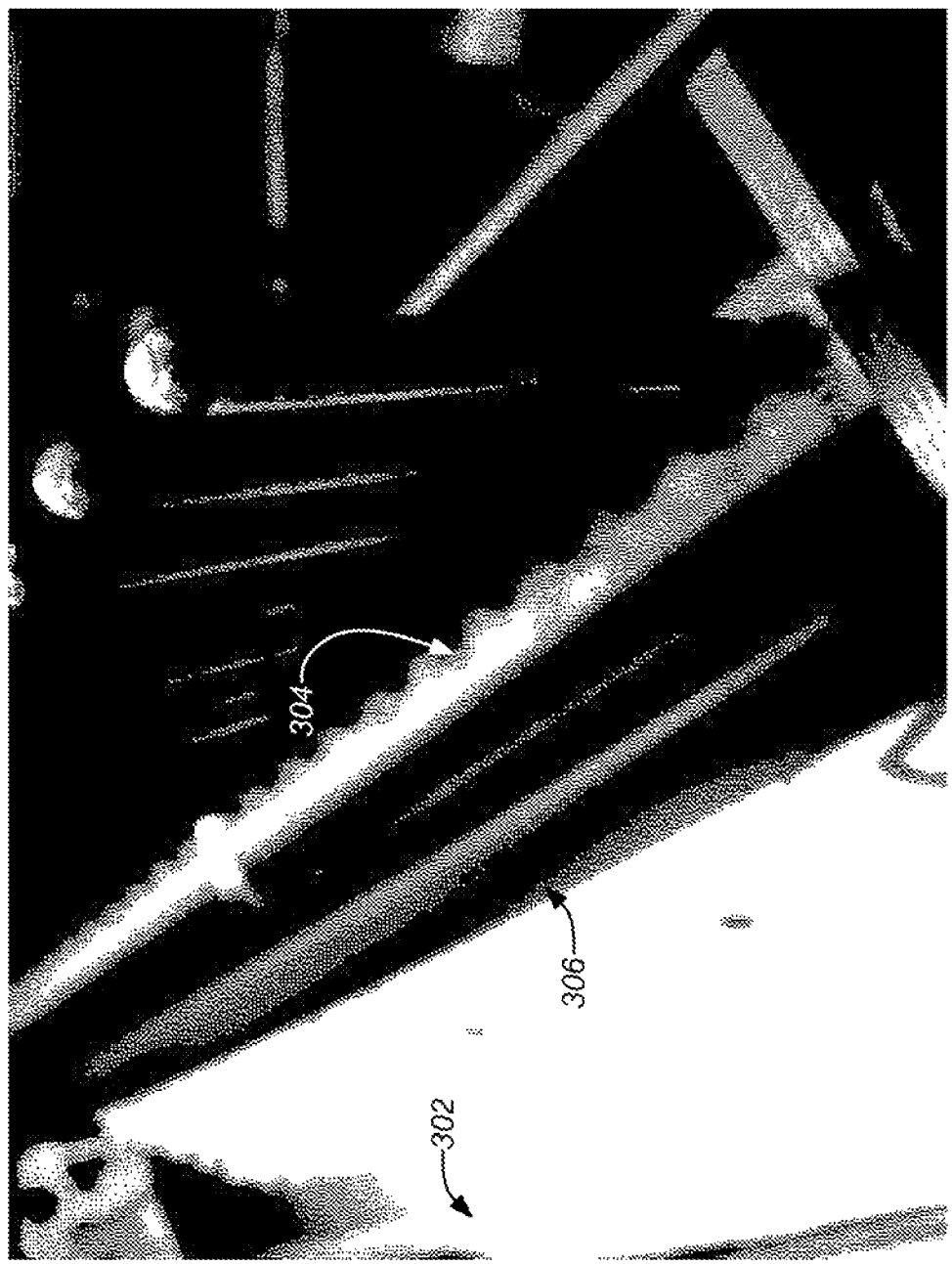
Figure 3D:
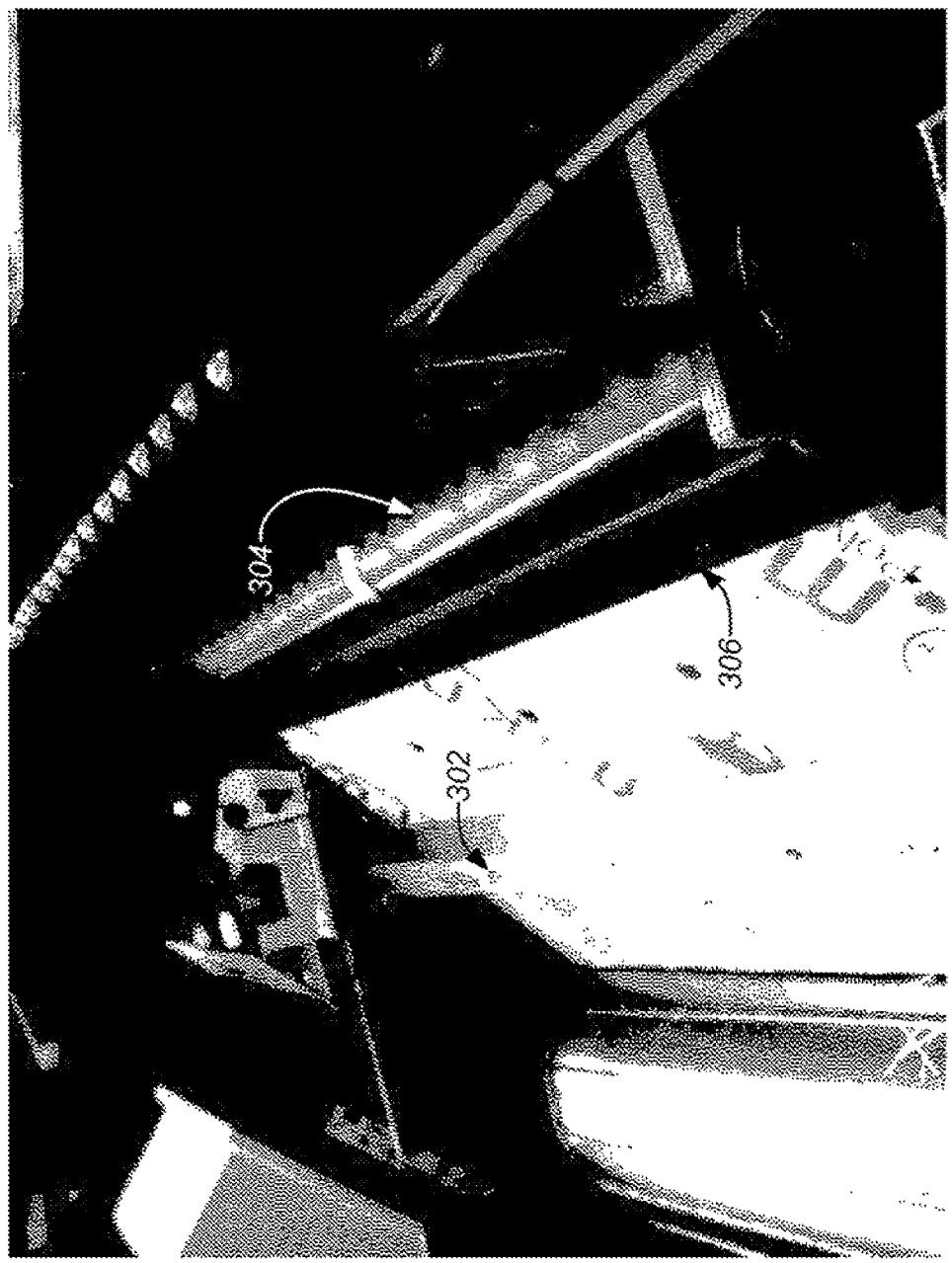

FIGS. 3A-3D illustrate an example embodiment of a fiber cutting device according to the present invention. FIG. 3A shows an image of a hand operated feed control toggle 302. The cutting head is covered in the lower left region and the feed bar 304 is in the upper right region. FIG. 3B shows another image of the same cutting device. FIG. 3C is a close up of the feed control toggle 302. The feed control toggle 302 is in the cutting position showing the rubberized edge 306 that will contact the feed bar 304 in the stop position. FIG. 3D is another close up of the feed control toggle 302 showing the rubberized edge 306 in contact with the feed bar 304 in the stop position. In the example, the feed control toggle 302 is implemented as a simple plastic plate. However, those skilled in the art will appreciate that any suitable material, e.g. metal, composite, etc., may also be employed. In addition it should be noted that the configuration of the feed control toggle 302 is not restricted to a plate with an offset pivot point. Other shapes and forms and pivot positions may be readily developed provided the element toggles between the defined stop and cutting positions to provide adequate pressure of fibers alternately to the feed bar 304 and the anvil roller. Similarly, materials for the feed control toggle 302 and/or the flap or edge for pressing the fibers against the anvil roller may be a rubber or rubber-like material or any other suitable material providing adequate friction and/or wear resistance as will be understood by those skilled in the art.

In addition, it should also be noted that although the cutting devices described herein may be described being driven by the anvil roller, it is also acceptable that they may be driven by the cutting head (or both or any other suitable drive means known in the art). It is only necessary that the cutting head and the anvil roller rotate in synchronization to cut fibers as previously described.

3. Manufacturing Using Controlled Fiber Cutting Device

As mentioned above, the described cutting principle can be applied to control individual strands to drop a varying fiber pattern onto a moving surface for some applications. Thus, embodiments of the invention may employ a described controlled fiber cutting device in various manufacturing systems that utilize cut fibers. For example, composite molds may require cut glass fibers to be deposited into molds containing resin. In another example, the fiber cutting device may be used to deposit fibers onto prefabricated wall sections. Active control of the deposited fibers enables significantly reduced waste as well as improved production.

FIGS. 4A and 4B illustrate an example embodiment of a fiber cutting device 400 controlling depositing of cut fibers 406 onto workpieces 402 on a moving surface 404. The fiber cutting device 400 is depicted schematically showing only the cutting head 204 and anvil roller 206. However, the fiber cutting device 400 may employ some or all of the elements of any of the fiber cutting devices described in the previous section that include a feed control toggle 208, 244 to provide controlled starting and stopping of fiber cutting.

The moving surface 404 may be a conveyer belt as shown or any other known suitable mechanism for manipulating workpieces 402 for cut fibers 406. As the workpieces 402 pass beneath the fiber cutting device 400, the fiber cutting device 400 is operated as previously described to intermittently prevent cutting of fibers during any gaps 408 between the workpieces 402 thus controlling the depositing of cut fibers 406 onto the workpieces 402 on the moving surface 404. Thus, the deposited cut fibers 410 are substantially limited to the workpieces 402.

The workpieces 402 may be any product requiring cut fibers. For example, molds for composites may have cut fibers deposited into the resin of the molds. The controlled cutting device 400 may be employed to minimize fiber waste and speed overall production by providing cut fibers only on demand. In addition, multiple feed control toggles may further enhance production options.

FIG. 4C illustrates a top view of an example embodiment of a fiber cutting device 420 controlling depositing of cut fibers in a two-dimensional pattern onto workpieces on a moving surface. The fiber cutting device 420 operates just as the device 400 shown in the side view of FIG. 4A. However, in this case a plurality of feed control toggles 422A-422C are employed (a feed control toggle and additional feed control toggles) as shown. (Note the motion of the moving surface 404 is also shown in a reversed direction over that of FIG. 4A.) In the example device 420, a total of twenty four separate feed control toggles 422A-422C are shown each separately operable to prevent cutting of a portion of the plurality of fibers. In the example, each separate feed control toggle 422A-422C may operate as the device 200 shown in FIGS. 2A-2C on separated fibers between each of the multiple pins 210 of the feed bar 202. Using a plurality of feed control toggles 422A-422C literally adds another dimensional to cut fiber application onto workpieces 402.

The plurality of feed control toggles 422A-422C may be separately operated to deliver a two-dimensional pattern of the cut plurality of fibers onto the workpieces on the moving surface. To illustrate, the plurality of feed control toggles 422A-422C are divided into three groups 422A, 422B and 422C. The example workpiece 424 may be prefabricated wall section having an opening 426, e.g. for a window, in it. As the workpiece 424 passes beneath the cutting device 420, feed control toggles 422A and 422C remain in a cutting position, but feed control toggles 422B begin in a cutting position but are switched to a stop position as the opening 426 passes under and then switched back to a cutting position. It will be apparent to those skilled in the art that such separate control of the each of the feed control toggles 422A-422C enables any two dimensional pattern of cut fibers to be delivered onto a workpiece on a moving surface passing beneath the cutting device 420.

It should be noted that embodiments of the invention employing multiple feed control toggles should employ computer controlled motors or servos for each of the feed control toggles to facilitate manipulation and coordination of the fiber cutting to deliver any two dimensional pattern to the workpieces on the moving surface as will be appreciated by those skilled in the art.

This concludes the description including the preferred embodiments of the present invention. The foregoing description including the preferred embodiment of the invention has been presented for the purposes of illustration and description. It is not intended to be exhaustive or to limit the invention to the precise forms disclosed. Many modifications and variations are possible within the scope of the foregoing teachings. Additional variations of the present invention may be devised without departing from the inventive concept as set forth in the following claims.

What is claimed is:

1. A fiber cutting apparatus, comprising:
   a cutting head disposed to rotate about a cutting head axis and having one or more blades disposed across a surface of the cutting head;
   an anvil roller disposed adjacent to the cutting head to rotate about an anvil axis and to have a surface in momentary contact with each of the one or more blades of the cutting head;
   a feeder for delivering a plurality of fibers between the cutting head and the anvil roller;
   a movable member that moves between a stop position, where the movable member is disposed proximate to the feeder for pressing the plurality of fibers against the feeder to stop motion of the plurality of fibers and prevent cutting, and a cutting position, where the movable member is disposed distal to the feeder for releasing the plurality of fibers from the feeder so that the plurality of fibers can be drawn into the momentary contact with each of the one or more blades of the cutting head; and
   a flap for pressing the plurality of fibers against the surface of the anvil roller such that the surface of the anvil roller draws the plurality of fibers to be cut into the momentary contact with each of the one or more blades of the cutting head only with the movable member in the cutting position.

2. The apparatus of claim 1, wherein the flap comprises a flexible flap portion that provides a sliding contact for pressing the plurality of fibers against the surface of the anvil roller.

3. The apparatus of claim 1, wherein the flap comprises a second end of a feed control toggle and the movable member comprises a first end of the feed control toggle.

4. The apparatus of claim 3, wherein the flap is to provide a sliding contact for pressing the plurality of fibers against the surface of the anvil roller.

5. The apparatus of claim 3, wherein a pivot of the feed control toggle is disposed between the first end and the second end of the feed control toggle.

6. The apparatus of claim 5, wherein the feed control toggle comprises a planar rectangular plate and the pivot is disposed offset from a plane of the planar rectangular plate.

7. The apparatus of claim 1, wherein the flap comprises a roller to provide a rolling contact pressing the plurality of fibers against the surface of the anvil roller.

8. The apparatus of claim 1, wherein the movable member includes an edge for pressing the plurality of fibers against the feeder to stop motion of the plurality of fibers.

9. The apparatus of claim 1, wherein the plurality of fibers comprise a plurality of glass fibers.

10. A fiber cutting apparatus, comprising:
 a cutting head disposed to rotate about a cutting head axis and having one or more blades disposed across a surface of the cutting head;
 an anvil roller disposed adjacent to the cutting head to rotate about an anvil axis and to have a surface in momentary contact with each of the one or more blades of the cutting head;
 a feeder for delivering a plurality of fibers between the cutting head and the anvil roller;
 a movable member that moves between a stop position, where the movable member is disposed proximate to the feeder for pressing the plurality of fibers against the feeder to stop motion of the plurality of fibers and prevent cutting, and a cutting position, where the first end of the movable member is spaced from the feeder for releasing the plurality of fibers from the feeder so that the plurality of fibers can be drawn into the momentary contact with each of the one or more blades of the cutting head; and
 a flap for providing a sliding contact for pressing the plurality of fibers against the surface of the anvil roller such that the surface of the anvil roller draws the plurality of fibers to be cut into-the momentary contact with each of the one or more blades of the cutting head and the anvil roller.

11. The apparatus of claim 10, wherein the first end of the feed control toggle includes an edge for pressing the plurality of fibers against the feeder to stop motion of the plurality of fibers.

12. A method of cutting fibers, comprising:
 disposing a cutting head to rotate about a cutting head axis, the cutting head having one or more blades disposed across a surface of the cutting head;
 rotating an anvil roller disposed adjacent to the cutting head about an anvil axis, the anvil roller having a surface for being in momentary contact with each of the one or more blades of the cutting head;
 delivering a plurality of fibers between the cutting head and the anvil roller with a feeder;
 pressing the plurality of fibers against the surface of the anvil roller with a flap such that the surface of the anvil roller draws the plurality of fibers to be cut into the momentary contact with each of the one or more blades of the cutting head and the anvil roller only with a movable member in a cutting position; and
 moving the movable member between a stop position, where the movable member presses the plurality of fibers against the feeder to stop motion of the plurality of fibers to prevent cutting, and the cutting position, where the movable member releases the plurality of fibers from the feeder so that the plurality of fibers can be drawn into the momentary contact with each of the one or more blades of the cutting head.

13. The method of claim 12, wherein the flap comprises a flexible flap portion that provides a sliding contact for pressing the plurality of fibers against the surface of the anvil roller.

14. The method of claim 12, wherein the flap comprises a second end of a feed control toggle and the movable member comprises a first end of the feed control toggle.

15. The method of claim 14, wherein the flap provides a sliding contact pressing the plurality of fibers against the surface of the anvil roller.

16. The method of claim 15, wherein a pivot of the feed control toggle is disposed between the first end and the second end of the feed control toggle and the feed control toggle comprises a planar rectangular plate and the pivot is disposed offset from a plane of the planar rectangular plate.

17. The method of claim 14, wherein the first end of the feed control toggle includes an edge for pressing the plurality of fibers against the feeder to stop motion of the plurality of fibers.

18. The method of claim 14, wherein the plurality of fibers comprise a plurality of glass fibers.

19. The method of claim 12, wherein the flap comprises a roller to provide a rolling contact pressing the plurality of fibers against the surface of the anvil roller.

20. A method of cutting fibers, comprising:
 disposing a cutting head to rotate about a cutting head axis, the cutting head having one or more blades disposed across a surface of the cutting head;
 rotating an anvil roller disposed adjacent to the cutting head about an anvil axis, the anvil roller having a surface for being in momentary contact with each of the one or more blades of the cutting head;
 delivering plurality of fibers between the cutting head and the anvil roller with a feeder;
 pressing the plurality of fibers against the surface of the anvil roller with a flap providing a sliding contact with the plurality of fibers such that the surface of the anvil roller draws the plurality of fibers to be cut into the momentary contact with each of the one or more blades of the cutting head and the anvil roller; and
 moving a movable member between a stop position, where the movable member is disposed proximate to the feeder for pressing the plurality of fibers against the feeder to stop motion of the plurality of fibers and prevent cutting, and a cutting position, where the movable member releases the plurality of fibers from the feeder so that the plurality of fibers can be drawn into the momentary contact with each of the one or more blades of the cutting head.

* * * * *